United States Patent
Johnston et al.

[11] 3,920,254
[45] Nov. 18, 1975

[54] PISTON OR LIKE SEALING OR PACKING

[75] Inventors: David E. Johnston, Gosforth Newcastle-upon-Tyne; Denis Wallace, Durham, both of England

[73] Assignee: George Angus & Company Limited, England

[22] Filed: Sept. 27, 1974

[21] Appl. No.: 509,748

[30] Foreign Application Priority Data
Oct. 12, 1973  United Kingdom............... 47789/73

[52] U.S. Cl.............. 277/206 R; 277/165; 277/177; 277/201; 277/215
[51] Int. Cl.²......................................... F16J 15/32
[58] Field of Search......... 277/206 R, 206.1, 70, 75, 277/76, 139, 140, 165, 173, 177, 201, 202, 215, 205

[56] References Cited
UNITED STATES PATENTS
2,451,762  10/1948  Millikan............................ 277/201
2,548,412  4/1951  Walker.............................. 277/201
3,174,761  3/1965  Workman.......................... 277/206
3,228,705  1/1966  Underwood....................... 277/206

FOREIGN PATENTS OR APPLICATIONS
827,564  2/1960  United Kingdom

Primary Examiner—Richard E. Aegerter
Assistant Examiner—L. Footland
Attorney, Agent, or Firm—Larson, Taylor and Hinds

[57] ABSTRACT

An elastomeric sealing ring, for use as a fluid packing in a piston groove or the like, is of V-shape in radial axial section, with a circumferential sealing band at one periphery and a pair of diverging flanges, each flange having a lateral, axially-directed, sealing band near its peripheral edge which edge is recessed for either flange to pass fluid under pressure to augment the sealing effect on the other flange and on the circumferential sealing band.

7 Claims, 4 Drawing Figures

PISTON OR LIKE SEALING OR PACKING

This invention relates to piston or like sealing or packing, including for example reciprocating rod packing, and provides primarily an improved elastomeric sealing ring for a circumferential groove in a pneumatic piston or cylinder.

The invention is applicable to other fluid or hydraulic packing for opposed cylindrical surfaces but will be described as applied to a sealing ring in a piston groove.

An object of the invention is to provide a double-acting sealing ring which will seal against fluid pressure in either axial direction and which can utilise the sealed fluid pressure to augment its sealing action.

The invention provides a sealing ring, for use as a fluid packing in a circumferential groove in one of opposed cylindrical surfaces to be sealed, of the kind comprising a moulded ring of elastomeric material with inner and outer circumferential sealing contact bands to seal against opposed surfaces.

According to the invention, the sealing ring is substantially of V-shape in radial axial section, so that it has a radially-directed apex portion forming a circumferential contact band at one periphery of the ring and a pair of oppositely obliquely-inclined circumferential flanges which diverge from the apex portion, each flange having on the axially outer side thereof a lateral, axially-directed, sealing contact band near the peripheral edge of the respective flange and recesses formed in such edge for axial passage of fluid past the flange.

The invention also includes the combination of the sealing ring in use with a groove in a cylindrical surface to be sealed.

In such combination, the sealing ring is housed in a groove so that its apex portion protrudes radially, for its sealing contact band to provide a circumferential seal against an opposed surface, only the lateral sealing contact bands of its flanges seal laterally, against one or both side walls of the groove, and the peripheral edges of the flanges do not seal against the base of the groove.

The effect of avoiding sealing of the flanges against the base of the groove is that, when the ring is under fluid pressure from one side, the flange facing the pressure can yield to admit fluid past its lateral seal and into the cavity between the flanges of the ring. The contact pressure of the lateral sealing contact band of the other flange and of the circumferential seal is consequently augmented by the fluid pressure differential.

To ensure that the ring flanges do not seal against the base of the groove. The ring or the groove may be provided with one or more slots or projections to prevent complete inner circumferential contact of the flanges against the groove base.

For example, the base of the groove may be formed with small radial projections or recesses or, more conveniently, a split spacer ring can be provided in the base of a uniform groove.

Preferably however the edges of the ring flanges are provided with open recesses for axial transfer of fluid beyond the lateral seal contact bands so as to ensure that fluid passing a lateral flange seal at the pressure side has access to the ring cavity.

The invention is illustrated by way of example on the accompanying drawings, in which.

The sealing ring V is moulded from an elastomeric material, such as an oil-resistant synthetic rubber, with its size, proportions and flexibility suitable to specified requirements in accordance with known characteristics for elastomeric pneumatic or hydraulic packings, for example of the O-ring type.

Figure 1:
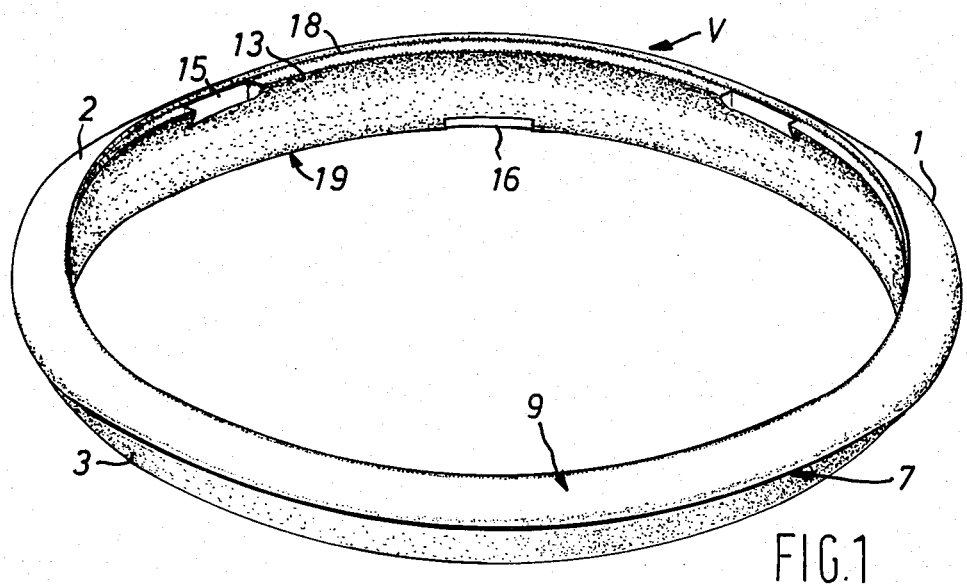
FIG. 1 is a perspective view of a sealing ring in accordance with the invention.
Figure 3:
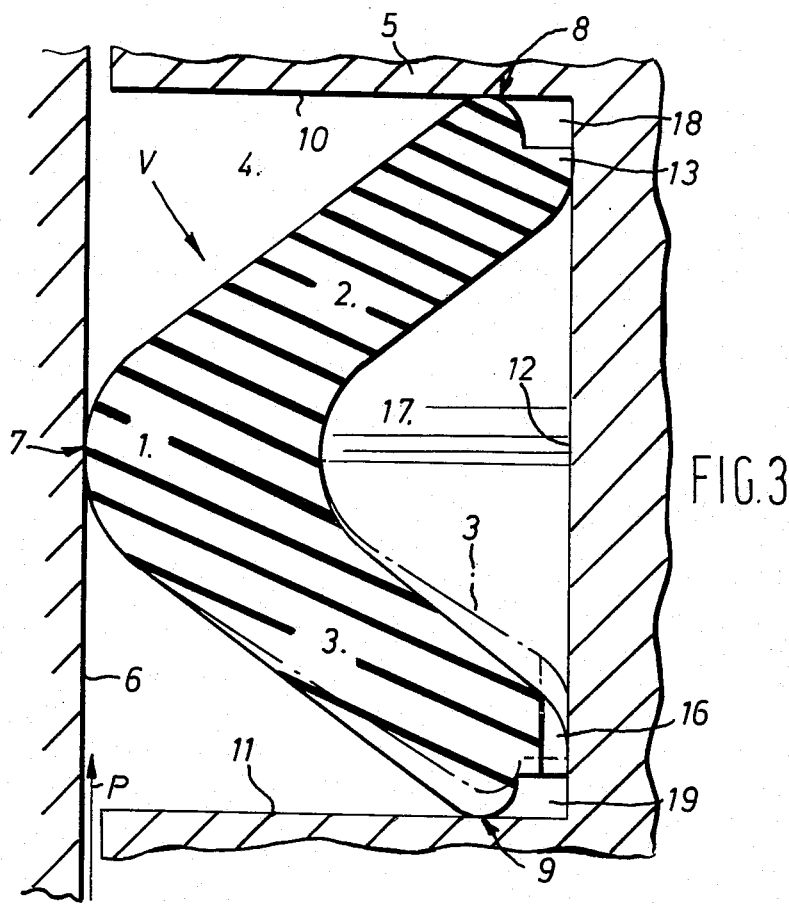
FIG. 2 is an enlarged fragmentary view of a sector of the sealing ring and FIG. 3 is an enlarged radial axial section of the sealing ring in a piston groove.
Figure 2:
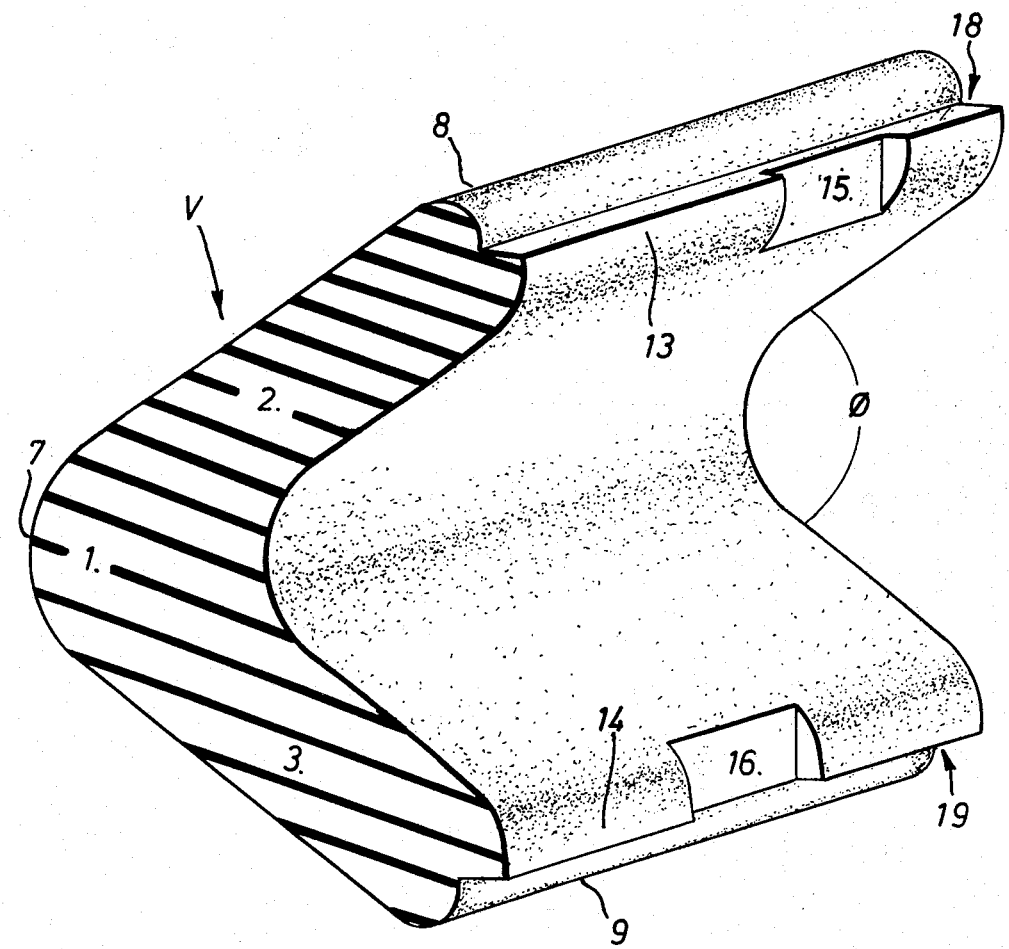

The sealing ring has a uniform radial axial section of V-shape, as shown by FIGS. 2 and 3, so that the ring has an outwardly radially-directed apex portion 1 from which diverge a pair of leg portions forming oppositely obliquely-inclined circumferential flanges 2 and 3. The included angle $\phi$ of the flanges is designed to suit the width of groove against the sides of which the flanges are to seal. The flanges 2 and 3 can flex, rather like the action of caliper legs, so as to seal against one side or the other, or against both sides simultaneously, of the piston groove or other cylindrical surface groove for which the ring is designed. Because of this flexing action, the ring may be described as of caliper shape in radial axial section.

In a typical use, FIG. 3, the ring V is housed in a groove 4 of a piston 5 so that the apex portion 1 encounters the surrounding cylinder wall 6 against which it bears by a circumferential sealing contact band 7 for packing the piston fluid-tight in its cylinder.

The ring flanges 2 and 3 each have, on the outer side, a lateral, axially-directed surface, 8 and 9 respectively, designed to provide a sealing contact band against the respective wall, 10 or 11, of the groove near to, but not against, the base 12 thereof.

Figure 3A:
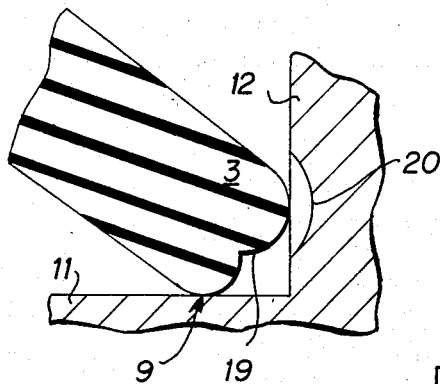
FIG. 3A shows a modification of the invention.

The edges 13 and 14 respectively of the flanges 2 and 3 have, at staggered angular intervals, recesses, 15 and 16 respectively, which stop short of the lateral sealing contact bands 8 and 9 but ensure transfer into the cavity 17, between the flanges 2 and 3, of fluid pressure past the respective lateral flange seal. Alternatively, as shown at 20 in FIG. 3A, recesses can be provided as slots into (or projections from) the base of the groove.

Such passage of fluid is designed to occur when the sealed fluid pressure, indicated as P, is high enough to deflect the facing flange inwardly, as indicated in broken lines for the flange 3.

The higher differential pressure on the outer side of the flange 3 and, in the cavity 14, on the inner side of the flange 2 augments the contact pressure and thus improves the sealing contact at both the lateral seal 8 and the circumferential seal 7.

Between the lateral sealing contact band and the recessed edge of each flange 2 and 3, thre is moulded a step or rebate, 18 and 19 respectively, which not only provides clear definition of the sealing contact band but has the practical advantage that the recesses are located entirely at the inner periphery of the ring and can be moulded by a central core pin moulding tool without requiring special shaping of upper and lower moulding tools.

It will be appreciated that for a cylinder wall groove a sealing ring could be provided with the same radial sectional shape as that illustrated but radially inverted so that the circumferential seal is at the inner periphery of the ring, the apex portion being inwardly radially-directed, and the flanges diverge obliquely outwardly.

We claim:

1. A sealing ring, for use as a fluid packing in a circumferential groove in one of opposed cylindrical surfaces to be sealed, comprising a moulded ring of elastomeric material with inner and outer circumferential sealing contact bands to seal against opposed surfaces, the sealing ring being substantially of V-shape in radial axial section, so that it has a radially-directed apex portion forming a circumferential sealing contact band at one radial periphery of the ring, as viewed in said radial axial section, and a pair of oppositely obliquely-inclined circumferential flanges which diverge from the apex portion and extend to further peripheries at the other radial periphery of the ring opposite from said one radial periphery, each said flange having on the axially outer side thereof a lateral, axially-directed, sealing contact band near the said further periphery of its respective flange, and wherein each said flange has open recesses through the radial edge of its respective further periphery beyond its respective lateral sealing contact band for axial passage of fluid past the flange.

2. A sealing ring according to claim 1 including a step formed between each said further periphery and its respective lateral sealing contact band.

3. A sealing ring according to claim 1 in combination with a groove in a cylindrical surface to be sealed wherein said lateral sealing contact bands are arranged to seal only against a respective wall of the groove and the said further peripheries of the flanges do not seal against the base of the groove.

4. In combination with a member having a cylindrical surface and a circumferential groove in said surface, a sealing ring in said groove to serve as a fluid-tight packing for said cylindrical surface against a relatively movable opposed cylindrical surface, said sealing ring being of elastomeric material substantially of V-shape in radial axial section and having an apex portion with a circumferential sealing contact band radially directed outwardly from the mouth of said groove and a pair of oppositely obliquely-inclined flanges which diverge from said apex portion, each said flange having on its axially outer side thereof, a lateral, axially-directed, sealing band to contact the opposed respective side of said groove, said flanges having peripheral edge portions at their radial ends opposite from said apex portion, said lateral, axially-directed sealing bands being located, radially, between the apex portion and the said peripheral edge portions, said sealing ring being positively radially located in said groove by operative seating of said peripheral edge portions with the base of the groove, said base and said peripheral edge portions having a means for providing a passageway for the axial transfer of fluid past the said peripheral edge portions of the flanges.

5. The combination of claim 4 including a step formed between each peripheral edge portion and its respective, lateral, axially-directed sealing band.

6. A combination according to claim 4, wherein said means for providing a passageway comprises open recesses formed through the radial edge of each respective peripheral edge portion.

7. A combination according to claim 4, wherein means for providing a passageway comprises open recesses formed into the base of the groove for the passage of fluid therethrough.

* * * * *